United States Patent
Fu et al.

(10) Patent No.: US 10,575,006 B2
(45) Date of Patent: Feb. 25, 2020

(54) VIDEO DATA DECODING AND DECODING METHOD

(71) Applicant: ALLWINNER TECHNOLOGY CO., LTD., Guangdong (CN)

(72) Inventors: Yongjie Fu, Zhuhai (CN); Jianfa Zou, Zhuhai (CN)

(73) Assignee: ALLWINNER TECHNOLOGY CO., LTD., Guangdong (CN)

( * ) Notice: Subject to any disclaimer, the term of this patent is extended or adjusted under 35 U.S.C. 154(b) by 164 days.

(21) Appl. No.: 15/751,398

(22) PCT Filed: Apr. 21, 2016

(86) PCT No.: PCT/CN2016/079836
§ 371 (c)(1),
(2) Date: Feb. 8, 2018

(87) PCT Pub. No.: WO2017/024812
PCT Pub. Date: Feb. 16, 2017

(65) Prior Publication Data
US 2018/0234690 A1    Aug. 16, 2018

(30) Foreign Application Priority Data
Aug. 10, 2015 (CN) .......................... 2015 1 0485813

(51) Int. Cl.
*H04N 19/423* (2014.01)
*H04N 19/91* (2014.01)
(Continued)

(52) U.S. Cl.
CPC ......... *H04N 19/423* (2014.11); *H04N 19/174* (2014.11); *H04N 19/44* (2014.11); *H04N 19/70* (2014.11); *H04N 19/91* (2014.11)

(58) Field of Classification Search
CPC .. H04N 19/174; H04N 19/423; H04N 19/436; H04N 19/44; H04N 19/70; H04N 19/91
(Continued)

(56) References Cited

U.S. PATENT DOCUMENTS

| 9,538,177 | B2 * | 1/2017 | Cheng | H04N 19/91 |
| 2014/0133581 | A1 * | 5/2014 | Naito | H04N 19/13 |
| | | | | 375/240.26 |

(Continued)

FOREIGN PATENT DOCUMENTS

| CA | 2897006 | 7/2014 |
| CN | 104811721 | 7/2015 |
| CN | 105187845 | 12/2015 |

OTHER PUBLICATIONS

Krishna, Rapaka et al. "On parallel processing capability of intra block copy" Joint Collaborative Team on Video Coding (JCT-VC) of ITU-T SG 16 WP 3 and ISO/IEC JTC 1/SC 29/WG 11 9th Meeting, Oct. 24, 2014.

*Primary Examiner* — James T Boylan
(74) *Attorney, Agent, or Firm* — Cozen O'Connor (57) ABSTRACT

A video data decoding device and method. The device has an entropy decoder, and a WPP status control module for selecting an operating status according to a syntax structure of a coding tree unit. The device further has a memory selector for controlling the operating status of a memory. The memory has one buffer memory and two update memories. When the number of columns of a row of coding tree units currently decoded is larger than three, the context data of the coding tree units currently decoded is written into the buffer memory and one of the update memories; and when it is determined that the context data of the coding tree units referred by a first coding tree unit in a next row of coding
(Continued)

tree units is available when the next row of coding tree units starts to be parsed, the data in the buffer memory is replicated.

10 Claims, 3 Drawing Sheets

(51) Int. Cl.
*H04N 19/44* (2014.01)
*H04N 19/174* (2014.01)
*H04N 19/70* (2014.01)

(58) Field of Classification Search
USPC .................................................. 375/240.25
See application file for complete search history.

(56) References Cited

U.S. PATENT DOCUMENTS

| | | | |
|---|---|---|---|
| 2016/0105682 A1* | 4/2016 | Rapaka | H04N 19/44 |
| | | | 375/240.12 |
| 2017/0094271 A1* | 3/2017 | Liu | H04N 19/105 |
| 2018/0020228 A1* | 1/2018 | Wu | H04N 19/436 |

* cited by examiner

| CTU10 | CTU11 | CTU12 | CTU13 | CTU14 | CTU15 | CTU16 | CTU17 |
|-------|-------|-------|-------|-------|-------|-------|-------|
| CTU20 | CTU21 | CTU22 | CTU23 | CTU24 | CTU25 | CTU26 | CTU27 |
| CTU30 | CUT31 | CTU32 | CTU33 | CTU34 | CTU35 | CTU36 | CTU37 |
| CTU40 | CTU41 | CTU42 | CTU43 | CTU44 | CTU45 | CTU46 | CTU47 |

VIDEO DATA DECODING AND DECODING METHOD

PRIORITY CLAIM

This is a U.S. national stage of application No. PCT/CN2016/079836, filed on Apr. 21, 2016. Priority is claimed on Chinese Application No. CN 201510485813.9, filed Aug. 10, 2015, the content of which is incorporated here by reference.

TECHNICAL FIELD

The present invention relates to the technical field of video data coding and decoding, and particularly, to a video data decoding device and a decoding method implemented by using the video data decoding device. The present invention is based on Chinese Patent Application No. 201510485813.9 filed on Aug. 10, 2015, the contents of which are incorporated herein by reference closely related to the present invention.

BACKGROUND ART

With the development of video coding and decoding techniques, people not only require a higher definition of video images but also have a high requirement on the coding and decoding speeds of the video images. Although the current predominant video coding and decoding protocols can meet the requirements for occasions such as high definition television, video monitoring and video conferencing, it will become increasingly difficult for the original video protocols to meet these requirements of high compression, a high code rate, high fidelity and the like for ultra high-definition video such as 4K×2K and 8K×4K with the continuous development of the video playing industry and the continuous improvement of the user experience. The video compression protocol standard HEVC (the H.265 protocol), as a new generation of video coding and decoding protocol, has the image compression ratio increased by about 50% as compared to the previous generation of the H.264 protocol under the premise of the image quality, and has the image structure greatly changed to enlarge the block size and incorporate parallel processing so as to well meet the requirements for processing the ultra high-definition video images.

In the H.265 protocol, the video is divided into a plurality of slices, each of which generally comprises a plurality of coding tree units (CTUs). Video decoding is to parse each of the coding tree units to obtain image data to be outputted. The concept of wavefront parallel processing (WPP) is proposed in the H.265 protocol, and this method is mainly for parallel processing of the coding tree units in the video slices to increase the image coding and decoding speeds and the image compression ratio.

Figure 1:
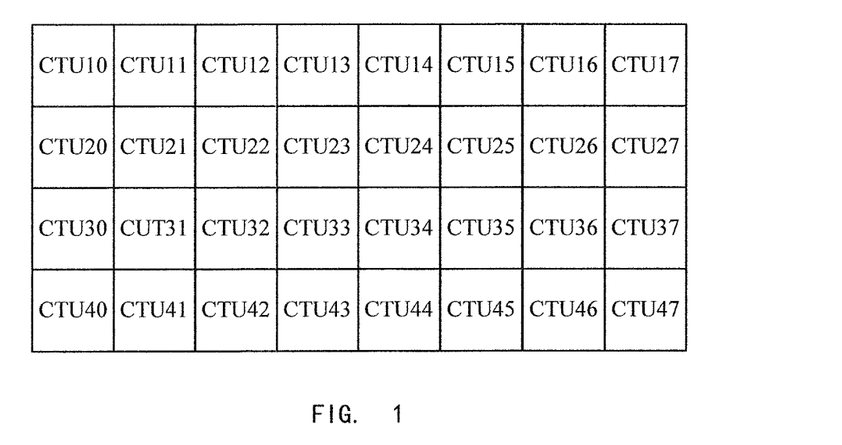
FIG. 1 is a schematic structural view of a coding tree unit in video decoding.

For one video slice having a plurality of rows and a plurality of columns in the WPP mode, decoding of coding tree units in a next coding tree unit row is started once decoding of two coding tree units in a current coding tree unit row is completed, and so forth. Thus, decoding of the coding tree units of the next row is gradually started so as to achieve parallel coding and decoding processing of the images. For example, as shown in FIG. 1, when a coding tree unit CTU16 in a first row is being decoded, decoding of a coding tree unit CTU24 in a second row, a coding tree unit CTU32 in a third row and a first coding tree unit CTU40 in a fourth row should be started.

The H.265 protocol adopts an arithmetic coding method named Context-based Adaptive Binary Arithmetic Coding (CABAC). During CABAC decoding in the WPP mode, image decoding of each row should be started by obtaining corresponding data such as context variables according to availability of a second coding tree unit in the previous row (except the video slice which has only one coding tree unit in a row) and the fact whether a starting position of the video slice is encountered, i.e., should be reinitialized or directly replicated so that arithmetic decoding contained in the video decoding process can proceed correctly.

Figure 2:
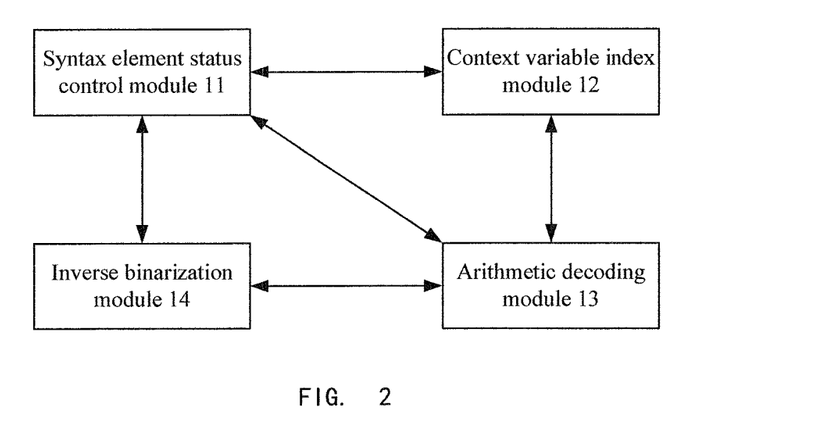
FIG. 2 is a block diagram of the structure of an existing video decoding device.

The existing video decoding chip generally comprises an embodied program, which includes an entropy decoding unit for carrying out entropy decoding on the video. As shown in FIG. 2, the entropy decoding unit comprises a syntax element status control module 11, a context variable index calculation module 12, an arithmetic decoding module 13 and an inverse binarization module 14. The syntax element status control module 11 gives a syntax element parsing status and transition indication by receiving an external control signal and information fed back from the context variable index calculation module 12, the arithmetic decoding module 13 and the inverse binarization module 14 and carrying out related operations. Under control of the syntax element parsing status control module 11, the context variable index calculation module 12 completes initialization and update of context data and also completes calculation of the syntax element context index in the entropy decoding process. The arithmetic decoding module 13 mainly completes parsing of an original code stream to a syntax element binary code string and transmits the parsing result in the form of a binary value to the inverse binarization module 14. The inverse binarization module 14 receives the binary value given by the arithmetic decoding module 13 and implements the binary to decimal parsing of the syntax element.

Technical Problem

As a large amount of context data is generated in the decoding process, these data is usually stored in a static random access memory (SRAM) and the entropy decoding unit usually stores the context data into only one static random access memory. The static random access memory not only needs to store the updated context data but also needs to replicate the context data as reference coding tree units so as to save the desired context data for subsequent decoding. As data update and cache and data replication have to be carried out in different address spaces when one static random access memory is used, it cannot be ensured that data update and replication are executed simultaneously in the decoding process, and this affects the decoding speed of the video and leads to slow playing of the video images.

Technical Solutions

A primary objective of the present invention is to provide a video decoding device for increasing the decoding speed of video images. Another objective of the present invention is to provide a video decoding method for increasing the video decoding efficiency.

To achieve the aforesaid primary objective, the video decoding device provided by the present invention comprises an entropy decoding unit. The entropy decoding unit comprises a syntax element status control module for receiving an external signal and outputting syntax element parsing status and transition information and a context variable index calculation module for receiving the information outputted by the syntax element status control module. The context variable index calculation module also initializes and updates context data, and calculates index information of the context data. The entropy decoding unit further comprises an arithmetic decoding module for parsing original video code stream data into syntax element binary code string data and an inverse binarization module for converting the binary code string data outputted by the arithmetic decoding module into decimal data. The video data decoding device further comprises a WPP status control module for selecting an operating status according to a syntax structure of a coding tree unit currently decoded and a memory selection module for controlling the operating status of a memory according to information outputted by the WPP status control module. The memory at least comprises one buffer memory and two update memories. When the number of columns of a row of coding tree units currently decoded is larger than three, the context data of the coding tree units currently decoded is written into the buffer memory and one of the update memories. When it is determined that the context data of the coding tree units referred by a first coding tree unit in a next row of coding tree units is available when parsing of the next row of coding tree units starts to be parsed, the data in the buffer memory is replicated into the other of the update memories.

In one preferred embodiment, the memory selection module is further configured to continue to use the original update memory for updating the context data of the coding tree units when it is determined that the context data of the coding tree units referred by a first coding tree unit in a next row of coding tree units is unavailable when the next row of coding tree units starts to be parsed.

As can be seen from this, the original update memory continues to be used for updating the context data of the coding tree units when the referred context data of the coding tree units is unavailable. This can avoid replication of the data and switching of the static random access memory, thus decreasing the power consumption of the video decoding device and increasing the use efficiency of the hardware.

In a further embodiment, the memory selection module is further configured to, while writing the context data of the coding tree units currently decoded into the buffer memory and one of the update memories, write the context data into the other of the update memories.

As can be seen, the updated context data is written into three buffers simultaneously in the initial video decoding period, and this can reduce the operation of data replication so as to increase the video decoding efficiency.

In a further embodiment, the memory selection module is further configured to use one of the update memories to store the context data of the coding tree units currently decoded when the number of columns of a row of coding tree units currently decoded is smaller than three. As can be seen from this, when the number of columns of a row of coding tree units currently decoded is smaller than three, the context data stored in the current update memory can be directly used for the next row of coding tree units. Therefore, there is no need for replication of the context data, and only one update memory is needed to store the updated context data.

In a further embodiment, the WPP status control module records at least three operating statuses, and the memory selection module controls switching of the operating statuses of the buffer memory and the update memories according to the information of the operating statuses outputted by the WPP status control module.

As can be seen, the WPP status control module records a plurality of different operating statuses, and the buffer memory and the update memories operate in the different operating statuses respectively. The operating statuses of the three memories can be controlled conveniently through switching of the plurality of operating statuses so as to meet the requirement of rapid switching of the operating statuses of the memories and increase the video decoding speed.

To achieve the aforesaid another objective, the video decoding method provided by the present invention comprises an entropy decoding step: receiving an external signal and outputting syntax element parsing status and transition information, concurrently initializing and updating context data of coding tree units to be decoded, calculating index information of the context data, parsing original video code stream data into syntax element binary code string data, and converting the binary code string data outputted by an arithmetic decoding module into decimal data. The video decoding method further comprises a memory selection step: in execution of the entropy decoding step, using at least one buffer memory and two update memories to store the context data; when the number of columns of a row of coding tree units currently decoded is larger than three, writing the context data of the coding tree units currently decoded into the buffer memory and one of the update memories; and when it is determined that the context data of the coding tree units referred by a first coding tree unit in a next row of coding tree units is available when the next row of coding tree units starts to be parsed, replicating the data in the buffer memory into the other of the update memories.

Advantageous Effects

The video data decoding device provided by the present invention can effectively increase the decoding efficiency to ensure fluency of video playing, and increases the video decoding efficiency by increasing the efficiency of writing data into the update memory.

Hereinbelow, the present invention will be further described in conjunction with the attached drawings and embodiments.

DETAILED DESCRIPTION OF THE INVENTION

The video decoding device of the present invention is configured for WPP CABAC decoding with the H.265 protocol in the serial manner, i.e., for video sequence decoding in the WPP mode in the serial manner. The video decoding method of the present invention is an entropy decoding method implemented using the above video decoding device.

Figure 3:
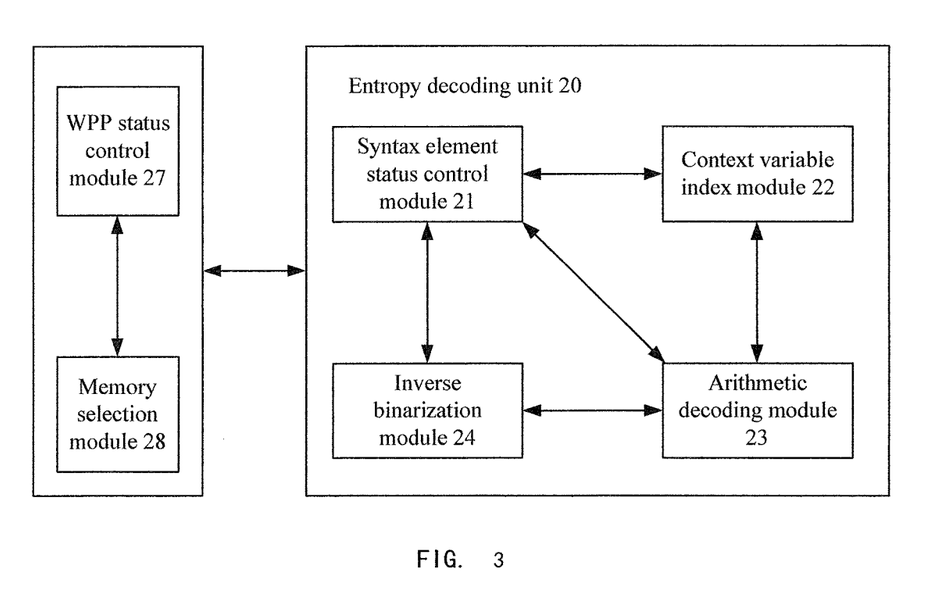
FIG. 3 is a block diagram of the structure of an embodiment of a video decoding device of the present invention.

Referring to FIG. 3, the video decoding device of the present invention has an entropy decoding unit 20, and the entropy decoding unit 20 has a syntax element status control module 21, a context variable index calculation module 22, an arithmetic decoding module 23 and an inverse binarization module 24. The syntax element status control module 21 gives a syntax element parsing status and transition indication by receiving an external control signal and information fed back from the context variable index calculation module 22, the arithmetic decoding module 23 and the inverse binarization module 24 and carrying out operations. Under control of the syntax element parsing status control module 21, the context variable index calculation module 22 completes initialization and update of context data and also completes calculation of the syntax element context index in the entropy decoding process. The arithmetic decoding module 23 mainly completes parsing of an original code stream to a syntax element binary code string and transmits the parsing result in the form of a binary value to the inverse binarization module 24. The inverse binarization module 24 receives the binary value given by the arithmetic decoding module 23 and implements the binary to decimal parsing of the syntax element.

The video decoding device further comprises a WPP status control module 27 and a memory selection module 28. The WPP status control module 27 is configured to select an operating status of the video decoding device, and specifically, control the operating statuses of three memories. In this embodiment, the video decoding device uses three static random access memories for storing the context data generated in the video decoding process, where one of the memories is a buffer memory labelled as M1 and two of the memories are update memories labelled as M0 and M2 respectively. Of course, the static random access memories may also be replaced by other types of memories such as dynamic random access memories (DRAMs). The three memories implement different functions in different operating statuses respectively such as receiving the updated context data and replicating the stored data. Hereinbelow, the operating process of the three memories in three operating statuses will be described in detail.

The memory selection module 28 receives the information outputted by the WPP status control module 27, which is information about selection of the operating statuses. The memory selection module 28 selects the memories for initialization of the context data, update of the context data and replication of the context data according to the information outputted by the WPP status control module 27, and concurrently transmits corresponding memory control signals to modules of the entropy decoding unit 20 so as to achieve timely interaction of the context data.

According to the requirement of entropy decoding with the H.265 protocol, decoding in the WPP mode is activated only when the number of columns of a row of coding tree units currently decoded is larger than two, and conventional entropy decoding is used when the number of columns of the coding tree units is one or two. Therefore, in this embodiment, five statuses (i.e., a dummy status, three operating statuses and an end status) are formed according to the operating statuses of the three memories in the decoding process, where the three operating statuses are status S0, status S1 and status S2 respectively. In different statuses, the three memories can complete operations such as initialization, update of the context data and replication of the context data. Hereinbelow, operations in the five statuses will be introduced.

In the dummy status, none of the three memories execute any operation. In the operating status S0, decoding of current coding tree units is started, and the three memories M0, M1 and M2 are initialized concurrently. The context data generated in the decoding process is stored all along in the update memory M0, while the buffer memory M1 and the update memory M2 only have the context data of two coding tree units stored therein.

In the operating status S1, the context data generated in the decoding process is stored all along in the update memory M2. Meanwhile, the buffer memory M1 has the context data of a first coding tree unit and a second coding tree unit stored therein, and when a third coding tree unit is decoding, the context data stored in the buffer memory M1 is replicated into the update memory M0.

In the operating status S2, the context data generated in the decoding process is stored all along in the update memory M0. Meanwhile, the buffer memory M1 has the context data of the first coding tree unit and the second coding tree unit stored therein, and when the third coding tree unit is decoding, the context data stored in the buffer memory M1 is replicated into the update memory M2.

The WPP status control module 27 outputs decoding end status information in the end status, and then transitions to the dummy status.

Figure 4:
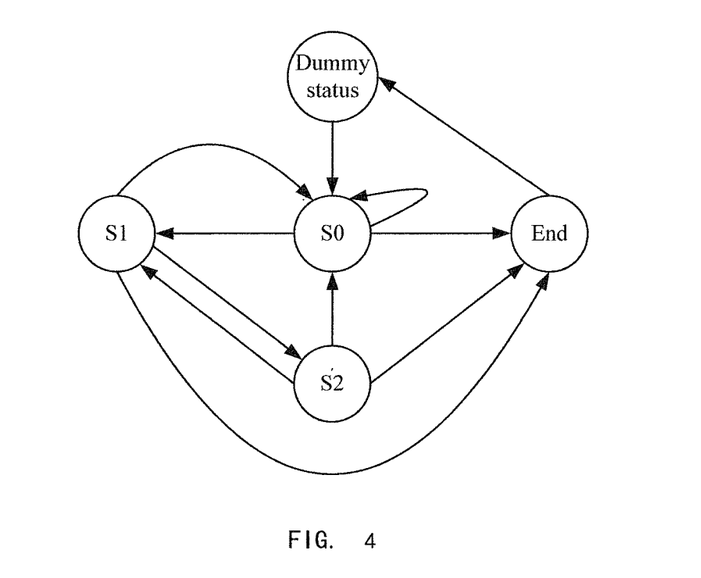
FIG. 4 is a transition diagram of five statuses in an embodiment of a video decoding method of the present invention.

Hereinbelow, transition among the above five statuses will be described with reference to FIG. 4.

In the dummy status, if the current image decoding process is in the WPP coding mode, then decoding of a first slice is activated. Moreover, when the number of columns of a row of coding tree units currently decoded is larger than two, the three memories are activated to transition to the operating status S0 from the dummy status.

In the operating status S0, there are three conditions as follows.

Condition one: if a coding tree unit currently decoded is the last coding tree unit of the current image, then it transitions to the end status when decoding of the current coding tree unit is ended.

Condition two: when a first coding tree unit in a row next to the coding tree unit currently decoded starts to be decoded, if the context data of a coding tree unit at the top right corner of the first coding tree unit in the next row is available (i.e., the context data of a coding tree unit needed for reference by the first coding tree unit in the next row can be used as the reference context data), then it transitions to the operating status S1.

Condition three: when the first coding tree unit in the row next to the coding tree unit currently decoded starts to be decoded, if the context data of the coding tree unit at the top right corner of the first coding tree unit in the next row is unavailable (i.e., the context data of the coding tree unit needed for reference by the first coding tree unit in the next row cannot be used as the reference context data), then the operating status S0 remains unchanged (i.e., the original update memory continues to be used for storing the context data of the coding tree unit currently decoded).

In the operating status S1, there are three conditions as follows.

Condition one: if a coding tree unit currently decoded is the last coding tree unit of the current image, then it transitions to the end status when decoding of the current coding tree unit is ended.

Condition two: when a new slice starts to be decoded or a first coding tree unit in a next row starts to be decoded, if the context data of a coding tree unit at the top right corner of the coding tree unit in the next row is unavailable, then it transitions to the operating status S0.

Condition three: when the first coding tree unit in the next row starts to be parsed, if the context data of the coding tree unit at the top right corner of the coding tree unit in the next row is available, then it transitions to the operating status S2.

In the operating status S2, there are three conditions as follows.

Condition one: if a coding tree unit currently decoded is the last coding tree unit of the current image, then it transitions to the end status when decoding of the current coding tree unit is ended.

Condition two: when a new slice starts to be decoded or a first coding tree unit in a next row starts to be decoded, if the context data of a coding tree unit at the top right corner of the coding tree unit in the next row is unavailable, then it transitions to the operating status S0.

Condition three: when the first coding tree unit in the next row starts to be parsed, if the context data of the coding tree unit at the top right corner of the coding tree unit in the next row is available, then it transitions to the operating status S1.

In the end status, it lasts for one clock cycle. Then, it transitions to the dummy status and the WPP decoding operation is ended.

To ensure that the context data for decoding is already prepared (i.e., a proper memory is selected for storing data), when a new row of coding tree units starts to be decoded, the memory selection module 28 will output a signal to the entropy decoding unit 20 each time switching of the operating status is completed.

Figure 5:
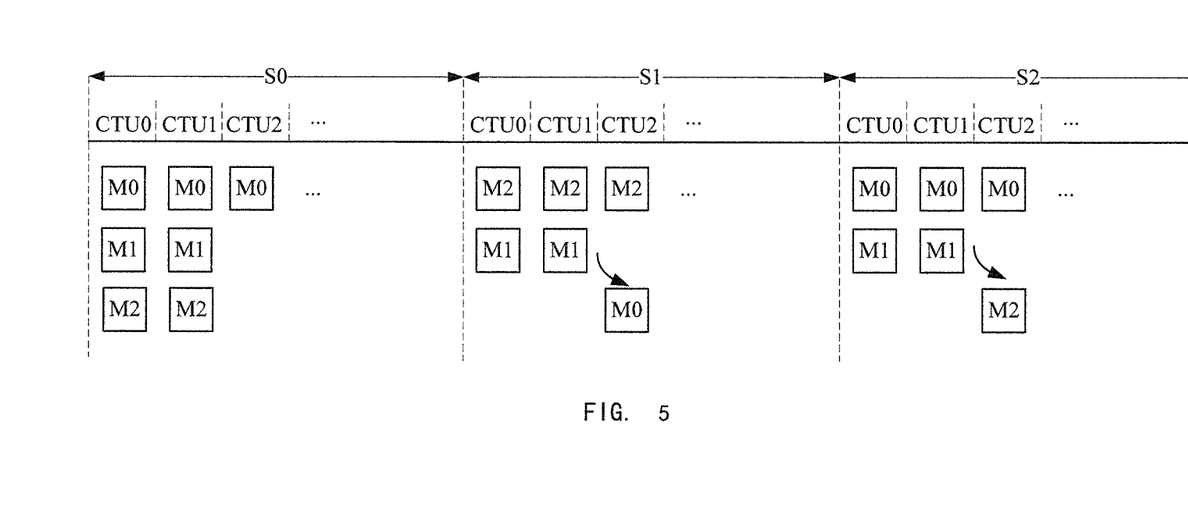
FIG. 5 is a schematic view showing operating statuses of a buffer memory and update memories in the embodiment of the video decoding method of the present invention.

Hereinbelow, how the memory selection module 28 controls the three memories to store the context data generated in the decoding process in the three operating statuses will be described with reference to FIG. 5.

In the operating status S0, before a first coding tree unit CTU0 starts to be decoded, storing of the initial context data of the three memories M0, M1 and M2 must be completed. At this time, the update memory M0 continuously stores the context data of each coding tree unit in the decoding process, but the buffer memory M1 and the update memory M2 only store the context data of the first coding tree unit CTU0 and a second coding tree unit CTU1.

In the operating status S1, in the decoding process of a row of coding tree units, the update memory M2 continuously stores the context data of each coding tree unit in the decoding process, and the buffer memory M1 only stores the context data of the first coding tree unit CTU0 and the second coding tree unit CTU1. Moreover, after all the syntax elements in the second coding tree unit CTU1 are parsed, the context data stored in the buffer memory M1 is replicated into the update memory M0. When the context data in the buffer memory M1 is completely replicated into the update memory M0, the memory selection module 28 outputs context data replication end information to the entropy decoding unit 20, instructs the syntax element status control module 21 to end the decoding operation of the current coding tree unit, and gets ready for the decoding operation of a third coding tree unit CTU2. In the operating status S2, in the decoding process of a row of coding tree units, the update memory M0 continuously stores the context data of each coding tree unit in the decoding process, and the buffer memory M1 only stores the context data of the first coding tree unit CTU0 and the second coding tree unit CTU1. Moreover, after all the syntax elements in the second coding tree unit CTU1 are parsed, the context data stored in the buffer memory M1 is replicated into the update memory M2. When the context data in the buffer memory M1 is completely replicated into the update memory M2, the memory selection module 28 outputs context data replication end information to the entropy decoding unit 20, instructs the syntax element status control module 21 to end the decoding operation of the current coding tree unit, and gets ready for the decoding operation of the third coding tree unit CTU2.

It is emphasized that the first coding tree unit CTU0, the second coding tree unit CTU1 and the third coding tree unit CTU2 described in each operating status refer to multiple continuous coding tree units arranged in the decoding sequence in a row of coding tree units. If it transitions from the operating status S0 to the operating status S1 and then to the operating status S2, then the first coding tree unit CTU0, the second coding tree unit CTU1 and the third coding tree unit CTU2 described in each operating status refer to multiple coding tree units in the current row of coding tree units decoded in the operating status. For example, the first coding tree unit CTU0, the second coding tree unit CTU1 and the third coding tree unit CTU2 in the operating status S0 refer to multiple coding tree units in the first row; the first coding tree unit CTU0, the second coding tree unit CTU1 and the third coding tree unit CTU2 in the operating status S1 refer to multiple coding tree units in the second row; and the first coding tree unit CTU0, the second coding tree unit CTU1 and the third coding tree unit CTU2 in the operating status S2 refer to multiple coding tree units in the third row.

According to an embodiment of the present invention, the buffer memory M1 functions to cache the context data, and is only responsible for replicating the context data of the second coding tree unit which has been decoded in the current row of coding tree units into the update memory M0 or M2. The update memory M0 or M2 is the memory for storing the context data updated during decoding of each coding tree unit in the current row of coding tree units. Moreover, the two update memories M0 and M2 are used alternately so as to ensure that neither of the update memories M0 and M2 needs to receive the updated context data while receiving the context data replicated from the buffer memory M1. This can increase the video decoding efficiency to ensure fluency of the video data playing.

In the condition where the number of columns of a row of coding tree units is smaller than three, the WPP status control module 27 is not activated. This is because the context data needs to be initialized before each coding tree unit starts to be decoded when there is only one column in the row of coding tree units currently decoded, and the initialized context data during each decoding can be stored by using only one update memory. When there are only two columns in the row of coding tree units currently decoded, the context data stored in the update memory is the context data of the second coding tree unit in the previous row of coding tree units before decoding of each row of coding tree units. If there is no need to initialize the context data, then the context data stored in the current update memory can be directly used for decoding of subsequent coding tree units. Therefore, when the number of columns of a row of coding tree units is smaller than three, the updated context data can be stored by using only one update memory, for example using only the update memory M0 or M2.

Of course, the aforesaid embodiment is only a preferred embodiment of the present invention, and more changes may further be made in practical applications. For example, one operating status may be set for each row of coding tree units. For a coded image in the WPP mode having multiple rows of coding tree units, five rows of coding tree units are used as the reference, one operating status is set for each row of coding tree units, and the buffer static random access memory for caching the context data is set and multiplexed reasonably, thereby effectively initializing or replicating the context data during decoding of each row of coding tree units and achieving true and concurrent WPP CABAC decoding operations.

Finally, it is emphasized that the present invention is not limited to the above embodiments, and changes such as modifications in the number of the used update memories, modifications in the number of the set operating statuses and modifications in true and concurrent WPP CABAC decoding control evolved therefrom should be also included within the scope of the claims of the present invention.

INDUSTRIAL APPLICABILITY

The video decoding device of the present invention stores the data generated in the decoding process by using three memories, wherein one of the memories is a buffer memory and the other two are update memories. The updated data is written into one of the update memories and the buffer memory in the decoding process, and the data in the buffer memory is replicated into the other of the update memories. This corresponds to that the two update memories receive the updated context data and the replicated data respectively, and avoids that the same memory needs to receive both the updated context data and the replicated data.

The context data generated in the video decoding process of the present invention is stored in two update memories and one buffer memory, the two update memories are used alternately, and the buffer memory is used to temporarily store the context data of the coding tree unit acting as the reference, which is replicated into the other update memory. Thus, the update memory need not receive the replicated data while updating the context data.

The invention claimed is:

1. A video data decoding device, comprising:
an entropy decoding unit, comprising:
a syntax element status control module for receiving an external signal and outputting syntax element parsing status and transition information;
a context variable index calculation module for receiving the information outputted by the syntax element status control module, initializing and updating context data, and calculating index information of the context data;
an arithmetic decoding module for parsing original video code stream data into syntax element binary code string data; and
an inverse binarization module for converting the binary code string data outputted by the arithmetic decoding module into decimal data;
Wavefront Parallel Processing (WPP) status control module for selecting an operating status according to a syntax structure of a coding tree unit currently decoded; and
a memory selection module for controlling the operating status of a memory according to information outputted by the WPP status control module, wherein the memory at least comprises one buffer memory and two update memories, and wherein when the number of columns of a row of coding tree units currently decoded is larger than three, the context data of the coding tree units currently decoded is written into the buffer memory and one of the update memories, and wherein when it is determined that the context data of the coding tree units referred by a first coding tree unit in a next row of coding tree units is available when the next row of coding tree units starts to be parsed, the data in the buffer memory is replicated into the other of the update memories.

2. The video data decoding device of claim 1, wherein:
the memory selection module is further configured to continue to use the original update memory for updating the context data of the coding tree units when it is determined that the context data of the coding tree units referred by a first coding tree unit in a next row of coding tree units is unavailable when the next row of coding tree units starts to be parsed.

3. The video data decoding device of claim 1, wherein:
the memory selection module is further configured to, while writing the context data of the coding tree units currently decoded into the buffer memory and one of the update memories, write the context data into the other of the update memories.

4. The video data decoding device of claim 3, wherein:
the buffer memory and the other update memory only store the context data of the second coding tree unit.

5. The video data decoding device of claim 1, wherein:
the memory selection module is further configured to use one of the update memories to store the context data of the coding tree units currently decoded when the number of columns of a row of coding tree units currently decoded is smaller than three.

6. The video data decoding device of any of claim 1, wherein:
the WPP status control module records at least three operating statuses, and the memory selection module controls switching of the operating statuses of the buffer memory and the update memories according to the information of the operating statuses outputted by the WPP status control module.

7. The video data decoding device of claim 6, wherein:
the memory selection module outputs a signal to the entropy decoding unit after controlling switching of the operating statuses of the buffer memory and the update memories according to the information outputted by the WPP status control module.

8. A video data decoding method, comprising:
an entropy decoding step for receiving an external signal and outputting syntax element parsing status and transition information, concurrently initializing and updating context data of coding tree units to be decoded, calculating index information of the context data, parsing original video code stream data into syntax element binary code string data, and converting the binary code string data outputted by the arithmetic decoding module into decimal data; and
a memory selection step in execution of the entropy decoding step, using at least one buffer memory and two update memories to store the context data, wherein when the number of columns of a row of coding tree units currently decoded is larger than three, writing the context data of the coding tree units currently decoded into the buffer memory and one of the update memories, and when it is determined that the context data of the coding tree units referred by a first coding tree unit in a next row of coding tree units is available when the next row of coding tree units starts to be parsed, replicating the data in the buffer memory into the other of the update memories.

9. The video data decoding method of claim 8, wherein:
the original update memory continues to be used for updating the context data of the coding tree units when it is determined that the context data of the coding tree units referred by a first coding tree unit in the next row of coding tree units is unavailable when the next row of coding tree units starts to be parsed.

10. The video data decoding method of claim 8, wherein: three operating statuses of the buffer memory and the update memories are recorded and operations of the buffer memory and the update memories are controlled according to the three operating statuses.

\* \* \* \* \*